P. C. Moulton.
Neck Tie.
No. 95,713.      Patented. Oct. 12. 1869.
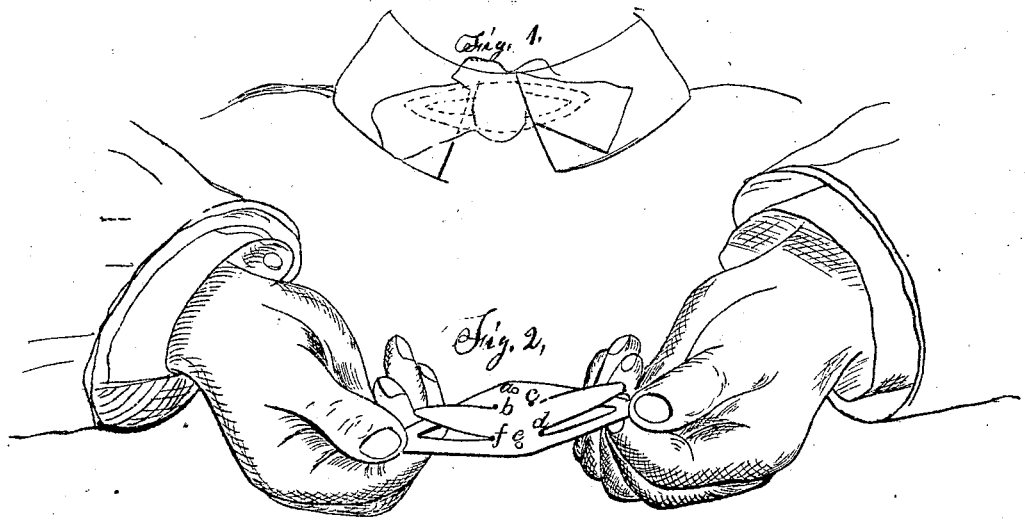
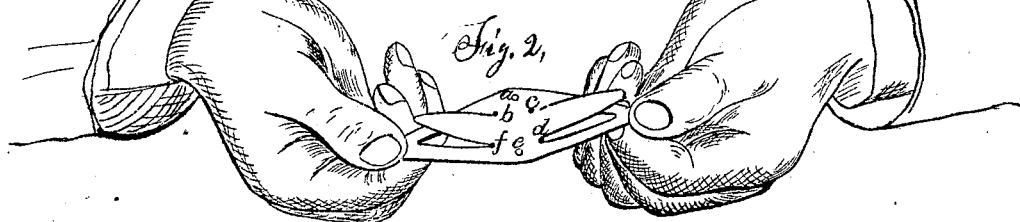
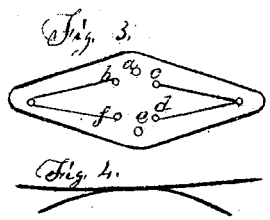
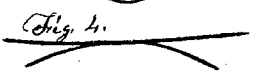
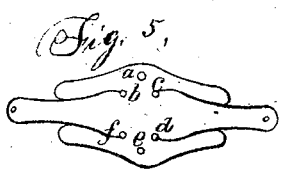
Witnesses,
R. Fitzgerald.
James W. Moulton.
Porter C. Moulton.

United States Patent Office.

PORTER C. MOULTON, OF NEW HAVEN, CONNECTICUT.

Letters Patent No. 95,713, dated October 12, 1869.

IMPROVEMENT IN NECKTIE-RETAINERS.

The Schedule referred to in these Letters Patent and making part of the same.

*To all whom it may concern:*

Be it known that I, PORTER C. MOULTON, of the city and county of New Haven, in the State of Connecticut, have invented a new and useful Improvement in Holders for Neckties; and I do hereby declare that the following is a full, clear, and exact description of the construction, character, and operation of the same, reference being had to the accompanying drawings, which make part of this specification, in which—

Figure 1 is a curved plan of the holder and tie, when attached to the collar.

Figure 2 is a perspective view of the tie-holder, when opened by the hands to attach it to the opposite parts of the collar.

Figure 3 is a plan of one form of the holder, as made of one piece, fitted to sustain the tie, and to grasp each part of the collar between the elastic parts, when the central parts are the shortest.

Figure 4 is a longitudinal plan of the same.

Figure 5 is a plan of the holder, when the central part is made the longest.

Figure 6 is a plan of the same, when the lower part is omitted.

My invention consists in making an improvement on my former application for patent, (not yet issued,) by making my necktie-holder of one piece of sheet-steel, or any other elastic material, instead of two pieces, as described in my former patent.

I make my necktie of one piece of sheet-steel, or any other suitably elastic material, in the form represented in figs. 2, 3, 4, 5, or 6, so that two or more of their elastic parts may, by their friction, hold the necktie to the collar, with entire safety, as two elastic clasps.

And I make the holes shown at $a, b, c, d, e, f$, &c., to enable me to sew the holder to the tie.

I would recommend making the holder in the form shown in fig. 2, in perspective, and fig. 3, in plan, and fig. 4, in longitudinal section, but it may produce the result nearly as well if made in the form shown in figs. 5 or 6, because either of the forms will produce the result of holding the tie to the collar, substantially as shown in fig. 1.

When either of the forms is used, it will securely clasp the collar, and hold the tie in the position represented in fig. 1.

Although the form shown in figs. 2 and 3 is preferable, yet, in some cases, it may be more convenient to make it in the form shown in figs. 5 or 6.

The advantages of my improvement consist in that, by making it of one piece, I can make it at much less expense, and also of less thickness, so that the tie may be held in a less prominent position, and therefore be more graceful.

What I claim as an improvement on my former application, and desire to secure by Letters Patent is—

As a new article of manufacture, a necktie-retainer, consisting of a metallic plate, with two tongues struck therefrom, and in one and the same piece therewith, as shown and described.

PORTER C. MOULTON.

Witnesses:
JAMES W. MOULTON,
R. FITZGERALD.